United States Patent
Novak et al.

(10) Patent No.: US 8,858,019 B2
(45) Date of Patent: Oct. 14, 2014

(54) LIGHT EMITTING DIODE (LED) LAMP REPLACEMENT SAFETY SWITCH FOR LINEAR FLUORESCENT LAMPS

(71) Applicant: General Electric Company, Schenectady, NY (US)

(72) Inventors: Krisztian Novak, Budapest (HU); Peter Zalka, Budapest (HU); Peter Dankovits, Budapest (HU)

(73) Assignee: General Electric Company, Schenectady, NY (US)

( * ) Notice: Subject to any disclaimer, the term of this patent is extended or adjusted under 35 U.S.C. 154(b) by 75 days.

(21) Appl. No.: 13/721,452

(22) Filed: Dec. 20, 2012

(65) Prior Publication Data

US 2014/0177203 A1    Jun. 26, 2014

(51) Int. Cl.
F21V 23/02 (2006.01)
F21S 8/00 (2006.01)
F21V 19/00 (2006.01)

(52) U.S. Cl.
CPC ............. *F21S 8/036* (2013.01); *F21V 19/0015* (2013.01)
USPC ........................ 362/223; 362/249.02; 362/221

(58) Field of Classification Search
USPC ..................................... 362/249.02, 221, 223
See application file for complete search history.

(56) References Cited

U.S. PATENT DOCUMENTS

| | | | |
|---|---|---|---|
| 4,306,758 A | 12/1981 | Johnson et al. | |
| 7,097,327 B1 | 8/2006 | Barton | |
| 7,344,398 B2 | 3/2008 | Sibout | |
| 7,549,787 B1 * | 6/2009 | Blaymore | 362/655 |
| 8,007,300 B2 * | 8/2011 | Vogt et al. | 439/239 |
| 8,147,091 B2 | 4/2012 | Hsia et al. | |
| 2005/0153590 A1 | 7/2005 | McCauley | |
| 2012/0147598 A1 | 6/2012 | Ivey | |
| 2013/0127327 A1 | 5/2013 | Heil et al. | |

FOREIGN PATENT DOCUMENTS

| | | |
|---|---|---|
| WO | 2012058556 A2 | 5/2012 |
| WO | 2012114097 A2 | 8/2012 |
| WO | 2012131522 A1 | 10/2012 |
| WO | 2012131547 A1 | 10/2012 |

OTHER PUBLICATIONS

"ETL-Listed T8 Fixture Replacements for LED Tube Lights", PRLOG—LEDtronics®, Jul. 8, 2011.

(Continued)

*Primary Examiner* — Ali Alavi (74) *Attorney, Agent, or Firm* — Global Patent Operation; Peter T. DiMauro (57) ABSTRACT

Provided is a system for replacing a fluorescent lamp with a light emitting diode (LED) into a conventional fluorescent lighting fixture without modifications. The lighting assembly includes an LED unit having a first end and a second end. The lighting assembly also includes a safety locking device positioned on at least one of the first end and the second end of the LED unit and coupled to a lighting fixture. The safety locking device comprises a safety switch defining an unarmed state and an armed state. To prevent a risk of shock, the safety switch is changed from the unarmed state to the armed state upon manual activation of the safety switch after the LED unit is moved into a locked position. The armed state enables an electrical communication between the two ends of the LED unit to activate the LED unit.

18 Claims, 6 Drawing Sheets

(56) References Cited

OTHER PUBLICATIONS

"LED T8 4-ft Tube Open Commercial Light Fixture", energy now, Product Catalogue.

"Aleddra "Double-Safety Switch" Linear LED Tube CRI 80+", Lightel Technologies Inc., Product Catalogue.

Int'l Search Report and Written Opinion dated Jun. 24, 2014 from corresponding Application No. PCT/US2013/075033.

* cited by examiner

LIGHT EMITTING DIODE (LED) LAMP REPLACEMENT SAFETY SWITCH FOR LINEAR FLUORESCENT LAMPS

I. FIELD OF THE INVENTION

The present invention relates generally to replacement of light emitting diode (LED) lamps. More particularly, the present invention relates to safety switches for safe installation and operation of LED lamps.

II. BACKGROUND OF THE INVENTION

In the field of electrical lighting, many different types of lights sources have been developed over the years. Recently, fluorescent light fixtures have been developed to take advantage of the greater electrical efficiency provided by such lights. Fluorescent lamps are negative differential resistance devices, so as more current flows through them, the electrical resistance of the fluorescent lamp drops, allowing even more current to flow. Connected directly to a constant-voltage power supply, a fluorescent lamp would rapidly self-destruct due to the uncontrolled current flow.

To prevent self-destruction, conventional fluorescent lamps must use a ballast to regulate the current flow through the lamp's glass tubes. However, when the ballasts and other components break down and require replacement, repair of the fluorescent light can be costly in terms of both parts and labor. Also, disposal of fluorescent lamps raises environmental issues because of their mercury content.

To address the problems associated with fluorescent lamps, LED lamps are now widely accepted as a more efficient and environmental friendly light source than fluorescent lamps. LED lamps allow electrical current to pass through the device in one direction while blocking current flow in the opposite direction. LED lamps provide many advantages as a lighting alternative compared to fluorescent lamps. Some benefits of using LED lamps include no mercury, operation in extreme cold conditions, longer life, and better energy efficiency.

To gain acceptance in the marketplace in terms of consumer safety, lighting fixtures are required to comply with regulatory standards established by organizations such as Underwriters Laboratories Inc. (UL) and International Electrotechnical Commission (IEC). One such set of standards is UL 1598C that governs electrically-active parts during installation of the LED lamps into existing fluorescent fixtures. To prevent the risk of fire and shock, these regulatory standards specify that there shall not be electrical continuity between the two ends of the tube during the insertion. Namely, the two ends of the tube must not be electrically connected during the insertion. The electrical current should not energize the LED light tube before it is completely installed in bi-pin sockets of the fixture.

During installation of a conventional replacement LED lamp, an exposed electrical pin presents a risk of shock to a user. Typically, when replacing, for example, an LED lamp including bi-pin end caps, the user inserts the first pair of pins at one end of the LED lamp into one electrical socket in the fixture, and then inserts the second pair of pins at the other end of the LED lamp into the other electrical socket in the fixture. When the first pair of pins is inserted into the socket, the second pair of pins is exposed because they are not yet inserted into the other socket. Although the LED lamp is shut off and deactivated, the internal electronic circuitry is still live and energizes the exposed pins. As a result, the user will be shocked if the exposed pins are touched.

To satisfy the required UL 1598C standards and to leverage the benefits of the fluorescent lights, most lighting manufacturers produce retrofit kits to install LED components in existing light fixtures. However, many of these kits require modification to the existing fixtures, and some still potentially create the risk of fire and shock. Often, highly trained technicians are required to perform these modifications. Thus, retrofitting and rewiring existing fluorescent fixtures can be quite expensive. Some manufacturers produce retrofit kits with two safety switches positioned at each end of the LED tube to attempt to protect against the risk of shock. Unfortunately, some of these LED tubes with double-ended safety switches still pose safety hazards. During a lamp replacement, insertion of one end of the tube into the lamp holder automatically arms the tube by pressing the switch, which creates the risk of shock if the pins at the other ends are touched.

In addition to addressing the risk of shock, efforts have been made by lighting manufacturers to provide a LED lamp that is simple enough for ordinary consumers to replace. Another problem associated with replacing fluorescent lamps is that each type of fluorescent lamp is designed with different electronic ballasts to properly start and operate the lamp. Today there are hundreds of different types of fluorescent lamps including different types of ballasts available on the market, which requires ballast manufacturers to carry an expansive inventory of ballast types. The most common electronic ballasts are switch start (preheat), rapid start, program start, and instant start.

A switch start (preheat) electromagnetic ballast uses a combination filament-cathode at each end of the lamp in conjunction with a starter switch that initially connects the filaments in series with the ballast, thereby preheating the filaments prior to striking an arc tube. The starter switch closes, permitting a heating current to flow through each electrode. The starter switch triggers the supply voltage to be applied across the arc tube to initiate the discharge. The electrode heating power is turned off after the lamp discharge is initiated.

A rapid start electronic ballast uses filament power windings within the ballast to provide a low voltage to the lamp prior to lamp ignition. The ballast applies voltage and heats the cathode simultaneously. The rapid start electronic ballast continues to heat the lamp electrodes even after the lamp is started.

Program start electronic ballasts include circuitry to preheat the lamp filaments to apply cathode heat before lamp ignition, and then remove it once the lamp is ignited. The ballast applies power to the filaments first, then after a short delay to allow the cathodes to preheat, applies voltage to the lamps to strike an arc.

Instant start electronic ballasts do use filaments to provide ignition. The ballasts of these tubes do not preheat the electrodes. Rather, they use a high voltage to break down the gas and mercury column to initiate the discharge arc. These tubes can be identified by a single pin at each end of the tube or a shunted lamp holder.

The above-described shortcomings significantly limit the replacement of fluorescent lamps with LED lamps within existing lamp fixtures. Therefore, there remains a need for a consumer friendly apparatus and method for conveniently replacing fluorescent lamps with LED lamps into existing lamp fixtures without modifications, yet complying with regulatory requirements. There also remains a need for a system and method of providing a replacement LED lamp compatible with various types of fluorescent ballast systems.

III. SUMMARY OF EMBODIMENTS OF INVENTION

In at least one aspect, embodiments of the present invention provide a lighting assembly for inserting a lamp into a conventional fluorescent lighting fixture without modification to the lighting fixture. The lighting assembly includes a LED unit having a first end and a second end. The lighting assembly also includes a safety locking device positioned on at least one of the first end and the second end of the LED unit and coupled to a lighting fixture.

The safety locking device comprises a safety switch defining an unarmed state and an armed state. The safety switch is mechanically linked and electrically connected to the LED unit. To prevent a risk of shock, the safety switch is changed from the unarmed state to the armed state upon manual activation of the safety switch after the LED unit is moved into a locked position. The armed state enables an electrical communication between the first end and the second end of the LED unit to activate the LED unit.

In at least another aspect, the present disclosure provides a light source including an LED unit having a first end and a second end. The light source also includes a safety locking device positioned on at least one of the first end and the second end of the LED unit, wherein the safety locking device comprises a first portion, a second portion, and a safety switch.

The first portion is configured to be coupled with a lighting fixture and the second portion is configured to be connected to the LED unit. When the LED unit is moved into a locked position, the first portion remains stationary, the second portion moves to provide access to the safety switch for activation and, to prevent a risk of shock during installation, the safety switch remains off in an unarmed position until manual activation.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

IV. BRIEF DESCRIPTION OF THE DRAWINGS

The accompanying drawings, which are incorporated herein and form part of the specification, illustrate the present invention and, together with the description, further serve to explain the principles of the invention and to enable a person skilled in the relevant art(s) to make and use the invention. The embodiments of the present invention are illustrated in the accompanying drawings, through which, like reference numerals may indicate corresponding or similar parts in the various figures.

The drawings are only for purposes of illustrating preferred embodiments and are not to be construed as limiting the disclosure. Given the following enabling description of the drawings, the novel aspects of the present invention should become evident to a person of ordinary skill in the art.

V. DETAILED DESCRIPTION OF VARIOUS EMBODIMENTS

The following detailed description is merely exemplary in nature and is not intended to limit the applications and uses disclosed herein. Further, there is no intention to be bound by any theory presented in the preceding background or summary or the following detailed description. While embodiments of the present technology are described herein primarily in connection with fluorescent lighting fixture, the concepts are also applicable to other types of mounted lighting fixtures.

In at least one aspect, the present disclosure provides a system and method for conveniently replacing a fluorescent lamp with a LED lamp. In at least one aspect, the present disclosure provides a lighting assembly for inserting a lamp into a conventional fluorescent lighting fixture without modification to the lighting fixture. The lighting assembly includes a LED unit having a first end and a second end.

The lighting assembly also includes a safety locking device positioned at a single end of the LED unit or both ends of the LED unit. The safety device is coupled to the lighting fixture. The safety locking device comprises a safety switch defining an unarmed state and an armed state. The safety switch is mechanically and electrically linked to the LED unit. To prevent a risk of shock, the safety switch is changed from the unarmed state to the armed state upon manual activation of the safety switch after the LED unit is moved into a locked position within the lighting fixture. The armed state enables an electrical communication between the first end and the second end of the LED unit to activate the LED unit. In one aspect, the safety locking device includes a protruding member that engages the lighting fixture for locking the safety locking device to the lighting fixture.

Figure 1:
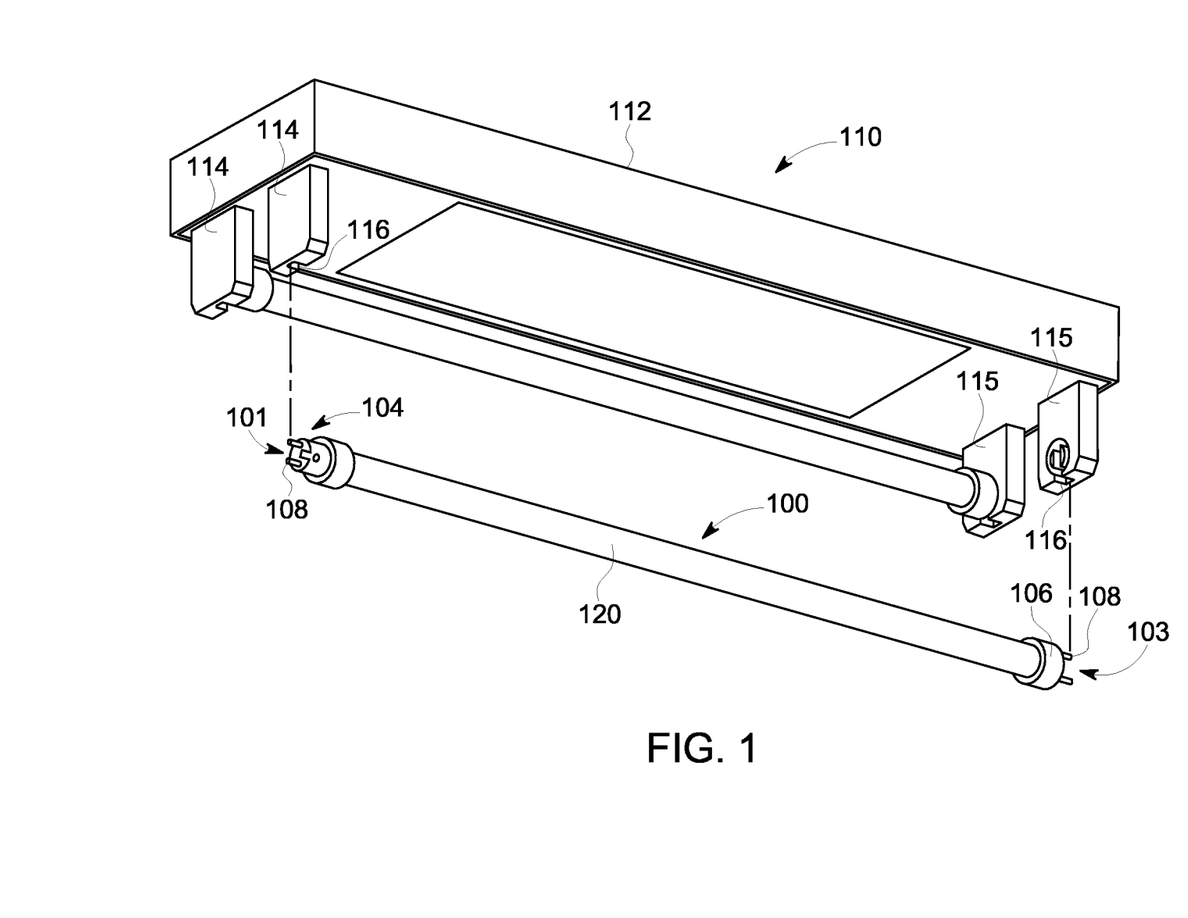
FIG. 1 is a perspective view of an exemplary replacement LED lamp in accordance with embodiments of the present invention.
Figure 2:
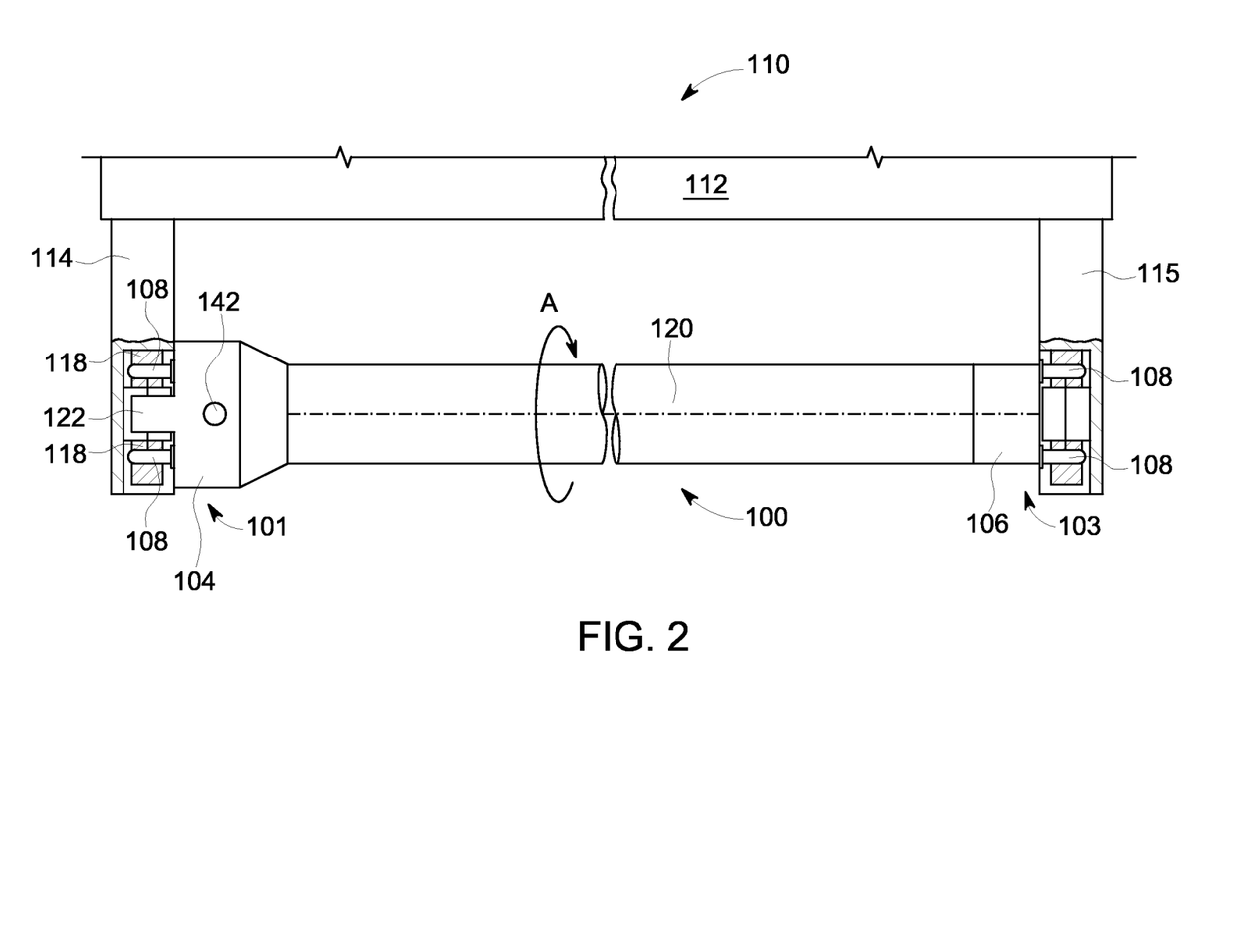
FIG. 2 is side view of the replacement LED lamp of FIG. 1 assembled in a fluorescent lighting fixture.

FIG. 1 is a perspective view of an exemplary replacement LED lamp in accordance with embodiments of the present invention. FIG. 1 includes a replacement LED lamp 100 that can be installed and operated within a conventional fluorescent lighting fixture 110 to replace a fluorescent lamp without modifications and in compliance with regulatory safety requirements is illustrated in FIGS. 1-2. Replacement LED lamp 100 may be used to replace fluorescent lamps in existing lighting fixtures to obtain the environmental and economic benefits of LED technology.

Replacement LED lamp 100 may be a double-capped LED lamp such as, for example, a T5 fluorescent lamp, a T8 fluorescent lamp, or a T12 fluorescent lamp. In particular, the system and method relates to light systems for replacing linear fluorescent lamps (LFL) with double-capped LED replacement lamps where a two end power supply is required. Replacement LED lamp 100 includes an elongated lamp tube

120. An array of LEDs 152 (FIGS. 5A-7C) are arranged and mounted on a rod extending through lamp tube 120 and oriented to produce light. End members 101 and 103 are positioned at each end of the lamp tube 120.

Electrical connection pins 108 are disposed within the end members 101 and 103. In the exemplary embodiment shown in the figures, replacement LED lamp 100 includes a safety locking device 104 connected at one end of the lamp tube 120. End member 101, for example, comprises a safety locking device 104 to prevent the risk of shock by blocking electronic communication between the two ends of the replacement LED lamp 100 when the lamp is not completely installed within the lighting fixture 110. At the opposite end of the exemplary lamp tube 120 shown in FIGS. 1-2, end member 103 includes a conventional bi-pin end cap 106. However, in an alternative embodiment, in lieu of the conventional bi-pin end cap, the safety locking device 104 can be connected at both ends 101 and 103. Furthermore, the safety locking device 104 can be configured for used in connection with a variety of lamp tubes having various end pin configurations, such as, a single end pin or a bi-pin end.

As illustrated in FIG. 2, replacement LED lamp 100 can be inserted into a conventional fluorescent lighting fixture 110. Lighting fixture 110 comprises a housing 112 in which lamp holders 114 and 115 are disposed at each end thereof for receiving end members 101 and 103. Lamp holders 114 and 115 include openings 116 that permit insertion of electrical connection pins 108 on the end of the replacement LED lamp 100 into lamp holders 114 and 115.

Lamp holders 114 and 115 are configured with openings 116 such that ends 101 and 103 are inserted into and fixed to the housing 110 in which contacts 118 (see FIG. 2) connect to electrical connection pins 108 of LED replacement lamp 100. A ballast (not shown) and various electric wires are installed in housing 112 so that the replacement LED lamp 100 is electrically connected to the electrical connection pins 108. The ballast is an electronic type ballast and can include electric components such as a resistor capacitor, a transformer and the like to limit the current provided to lamp 100. The ballast provides an amount of current required for proper lamp operation.

A replacement LED lamp 100 in accordance with the embodiments can have the ability to be installed in a variety of fluorescent lighting fixtures having different types of ballasts, including, for example, switch start (preheat) electronic ballasts, rapid start electronic ballasts, and program start electronic ballasts. Thus, according to an embodiment, a single LED lamp system can be easily replaced within various fluorescent lamps including different types of ballasts. When in use with an LED lamp, the ballast delivers an operating current to the replacement LED lamp 100 during operation. The electrical contacts 118 within lamp holder 114 are electrically wired to enable sufficient operation of the replacement LED lamp 100 and wired to an electrical ballast (not shown) within housing 112.

Figure 3:
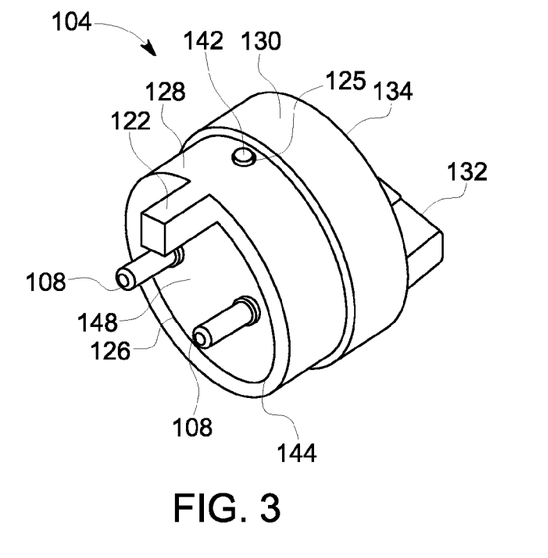
FIG. 3 is a perspective view of a safety locking device in accordance with the embodiments.

In FIG. 3, safety locking device 104 includes a safety device housing 134, a locking mechanism 122, and a safety switch 124 (FIGS. 7A-7C), which is activated by a switch button 142. Safety device housing 134 is preferably made from plastic material or other non-conducting material and formed having circular walls including a first housing part 128 and a second housing part 130.

The housing parts 128 and 130 can be unitary and formed together to define a single cavity 144. In an alternative embodiment, the housing parts 128 and 130 may be separate pieces joined together to form the cavity 144. In some embodiments, the second housing part 130 may be configured having an outer circumference slightly larger than the first housing part 128 to receive an end of the lamp tube 120 therein. In other embodiments, the safety device housing 134 may be formed having a uniform circular wall.

Figure 7A:
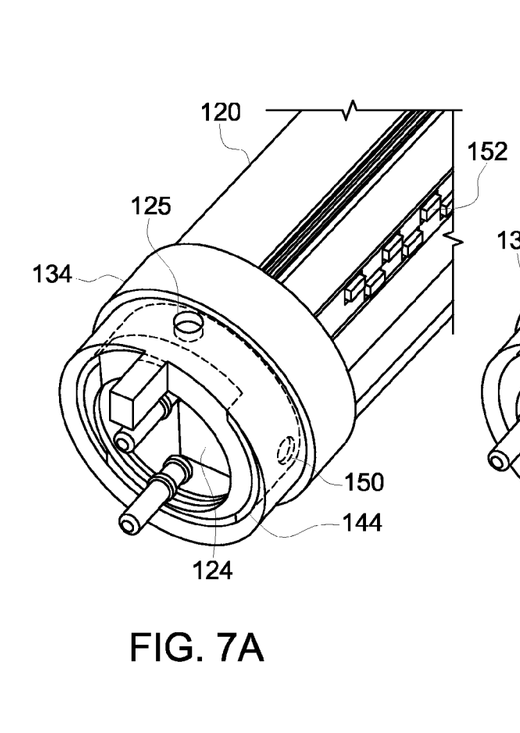
FIGS. 7A-7C illustrate insertion, twisting, and arming of the LED replacement lamp during the various phases of operation.
Figures 7B, 7C:
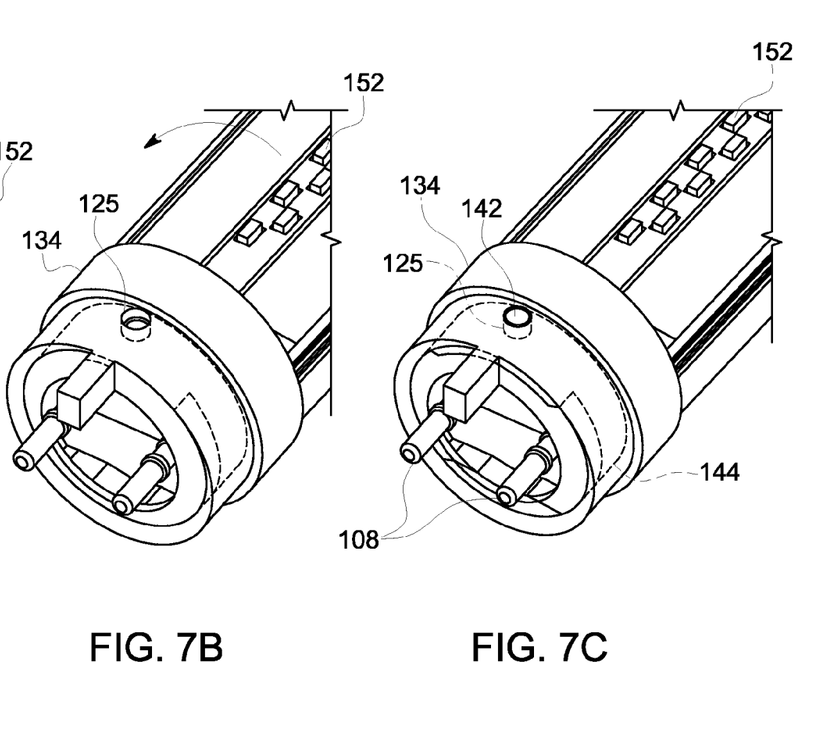

Positioned within the cavity 144 is an internal cylindrical chamber 126 comprising a front plate 148 and an end portion 132. The internal chamber 126 extends through the safety device housing 134, as shown in FIGS. 7A-7C, and is permanently affixed to the lamp tube 120. The internal chamber 126 can be a separate piece mechanically mounted to the lamp tube 120 or may be integral with the lamp tube 120. The internal chamber 126 may be connected to the lamp tube 120, for example, with standard screw connectors. As shown in FIGS. 7A-7C, the safety device housing 134 surrounds internal chamber 126 and an end portion of the lamp tube 120 such that the internal chamber 126 together with the lamp tube 120 may be rotated with respect to the safety device housing 134, as shown in the direction by arrow A in FIG. 2.

Front plate 148 includes a pair of apertures through which a pair of the electrical connection pins 108 is arranged. When assembled within the lighting fixture 110 as shown in FIG. 2, these pins 108 engage electrical contacts 118 of lamp holder 114 and apply electrical power to the LED lamp 100 when the safety switch 124 is activated.

The safety locking device 104 comprises both mechanical and electrical components, locking mechanism 122 and safety switch 124, that cooperate to minimize the risk of shock. Locking mechanism 122 functions as a mechanical component, and safety switch 124 functions as both an electrical and mechanical component to protect the user from shock during installation of the lamp 100 as will now be described.

Provided in the first housing part 128 is locking mechanism 122 defined as a protruding member extending outwardly from the safety device housing 134. When the LED replacement lamp 100 is inserted within the lighting fixture 110 as shown in FIG. 2, the locking mechanism 122 is designed and arranged to mate with opening 116. Then, the lamp tube 120 is moved into a locked position to secure it within the housing 112. During the locking movement of the lamp tube 120, the locking mechanism 122 is engaged within the opening 116 and prevents movement between the safety device housing 134 and the lamp holder 114. The LED replacement lamp 100 can be inserted and locked into the lighting fixture by employing various types of locking movements. For example, the locking movement applied to the lamp tube 120 to lock it within the lighting fixture 110 may include, for example, rotational movement, linear movement, diagonal movement, or a combination thereof. For example, rotational movement is described and depicted in FIGS. 5A-7C in the exemplary embodiments discussed below.

Figure 4:
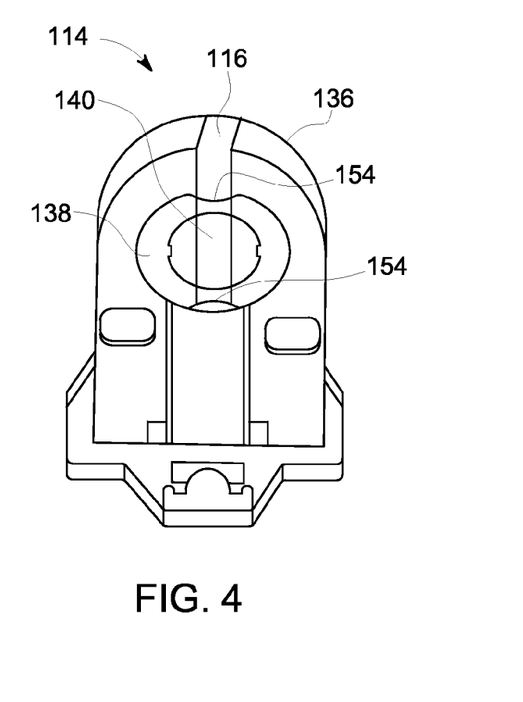
FIG. 4 is a perspective view of an example of a lamp holder that can be employed for engagement with the replacement LED lamp of FIG. 1.

FIG. 4 is an example of a lamp holder 114 and 115 that can be employed for engagement with the LED replacement lamp 100. Those having skill in the art would understand, however, that other lamp holders having different configurations may be employed. The lamp holders 114 and 115 include a lamp holder housing 136 of insulating, preferably plastic, material. A rotatable disk member 138 is disposed within housing 136 and is rotatable therewithin. The lamp holder housing 136 includes opening 116 that defines a channel 140 extending from the top and passing through the disk member 138. Opening 116 enables the electrical connection pins 108 of the LED lamp 100 to slide into the channel 140 of the rotatable disk member 138 such that the opening 116 engages and mates with locking mechanism 122 to prevent rotation relative to the lamp holder 114 and 115.

Figure 5A:
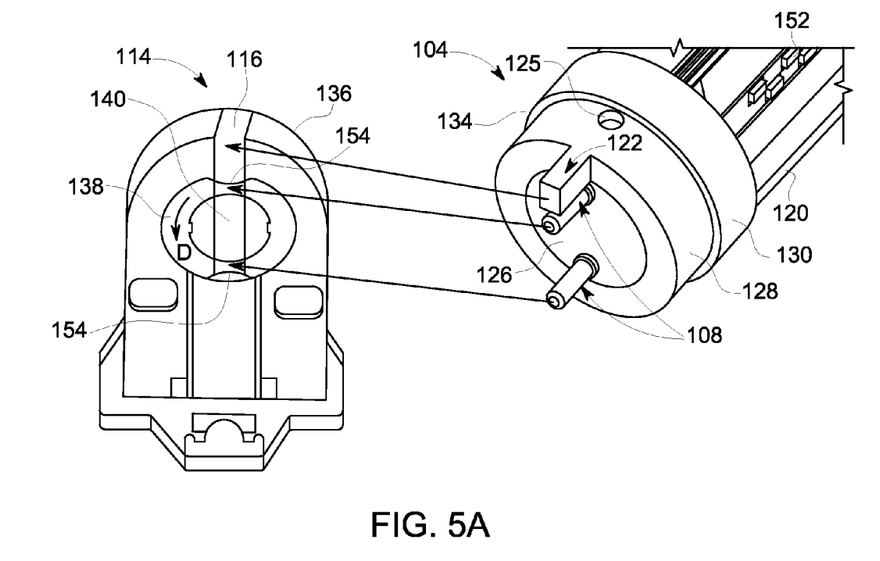
FIGS. 5A-5B illustrate insertion of the LED replacement lamp within the lamp holder.
Figure 5B:
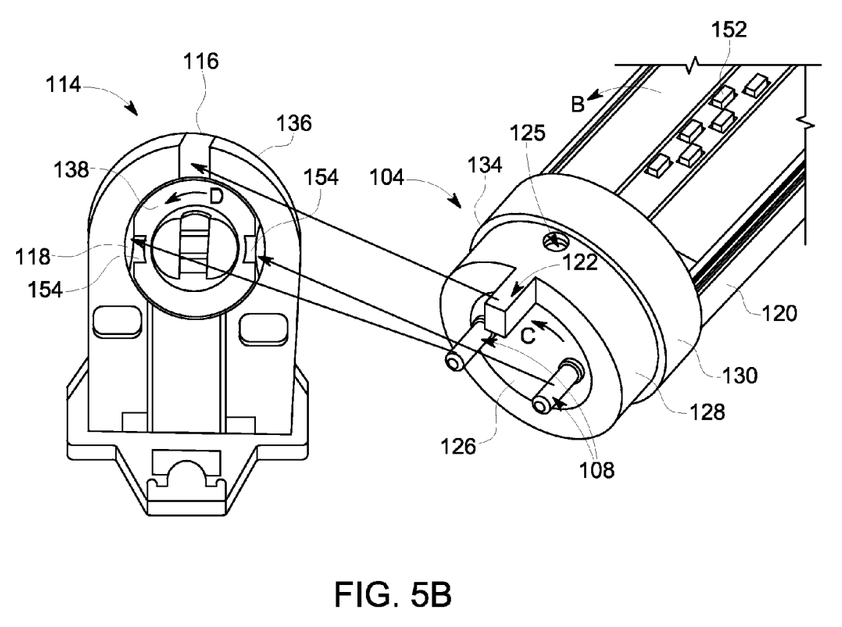

FIGS. 5A-5B illustrate an example of the installation of end 101 of lamp tube 120, which comprises a safety locking device 104, into the lamp holder 114 of the lighting fixture 110. However, installation of the opposite end 103 of the lamp tube 120, which comprises a conventional bi-pin end cap, including pins 108, is performed according to standard installation procedures. Such procedures are well known to those of skill in the art and, therefore, are not described herein.

When replacing a conventional fluorescent lamp with a replacement LED lamp 100 in accordance with the embodiments, initially, the channel 140 is aligned with opening 116 to receive pins 108 when the rotatable disk member 138 is in the position as shown in FIG. 5A. Electrical connection pins 108 are inserted through opening 116 into channel 140 of the rotatable disk member 138 until locking device 122 mates with the opening 116.

After the pins 108, at both ends 101 and 103, are received in the lamp holders 114 and 115, respectively, electrical contacts 118 initially are not in contact with the pins 108. The lamp tube 120 is then rotated approximately 90 degrees (illustrated by arrow B in FIG. 5B) to secure the lamp 100 within the housing 112. Surrounded by the safety device housing 134, the lamp tube 120 in connection with the internal chamber 126 accordingly rotates 90 degrees (as indicated by arrow C in FIG. 5B) within the safety device housing 134 while the locking device 122 keeps the safety device housing 134 stationary. As mentioned above, the rotational movement of the lamp tube 120 serves as the locking movement, which locks the lamp tube 120 into the lighting fixture 110. It should be understood that the rotational movement depicted in the figures is nonlimiting and exemplary only. Those skilled in the art would understand that various locking movements may be envisioned without departing from the scope of the present teachings. For example, the locking movement applied to the lamp tube to lock it within the lighting fixture may include, for example, rotational movement, linear movement, diagonal movement, or a combination thereof depending upon the configuration of the lamp holder installed within the lighting fixture.

As shown in the example in FIG. 5B, rotation of the lamp 120 causes the pins 108 inserted within the lamp holder 114 to correspondingly rotate the rotatable disk member 138 approximately 90 degrees in the direction of arrow D from the position shown in FIG. 5A to the position in FIG. 5B. This 90 degree rotation turns the narrow portions 154 of the rotatable disk member 138 from the positions in FIG. 5A to the positions in FIG. 5B, which exposes the electrical contacts 118. Contact is now made between the pins 108 and the electrical contacts 118 by rotating the lamp tube 120. However, in this position, in accordance with an illustrious embodiment, the safety switch 124 still prevents the lamp from being energized because the two lamp pins are not in electrical communication until the safety switch 124 is activated.

In compliance with the regulatory requirements, safety switch 124 prevents operation of the electrical components, when both ends 101 and 103 of the replacement LED lamp 100 are not completely inserted into the lighting fixture 110 and one end remains exposed during the installation process. If the electrical connection is permitted to remain live during installation of the replacement LED lamp 100 under such circumstances, a user inadvertently touching an exposed pin could be dangerously shocked. Safety switch 124 thus serves to avoid such electric shock.

The safety switch 124 controls activation of the current through the LED replacement lamp 100. The safety switch 124 can be, for example, a bi-stable push button switch mounted in an internal chamber 144, as shown in FIG. 7A. The safety switch 124 is mechanically attached to the replacement LED lamp 100. When the lamp 100 is installed in the lighting fixture 110, the safety switch 124 is electrically connected to the housing 112 and the replacement lamp 100. The safety switch 124 can be configured to switch between an off position (unarmed) and an on position (armed). In the off position (unarmed), the safety switch 124 breaks contact between the electrical circuitry in the housing 112 and the replacement LED lamp 100. The safety switch 124 effectively breaks the connection such that the lamp 100 will not function.

FIGS. 7A-7C are illustrations of the safety switch 124 in successive phases of operation—changing from the unarmed state (FIG. 7A) when the lamp tube 120 is rotated (FIG. 7B) and activation of the switch button 142 to the armed state (FIG. 7C). The switch button 142 is a component of the safety switch, and the safety switch 124 is activated by the switch button 142. Namely, rotation of the lamp 100 within the lighting fixture 110 does not arm the switch 124. Rotation of the lamp 100 aligns bore 150 in the internal chamber 144 with a bore 125 provided in the safety device housing 134 to provide access to the switch button 142.

Rotation of the lamp tube 120 provides access to the switch button 142 through bore 125 to enable manual activation of the safety switch 124. The safety switch 124 is designed to require manual activation through bore 125 to prevent inadvertent activation of the switch during installation and to prevent the risk of shock. To arm the safety switch 124, an activation mechanism (not shown), such as a pin, is inserted through bore 125 to urge button 142 upward to the armed position. A pointed tool (not shown) can be inserted within bore 125 to depress switch button 142. The first depression causes the switch button 142 to extend outward of bore 125 and assume an armed position.

Figure 6:
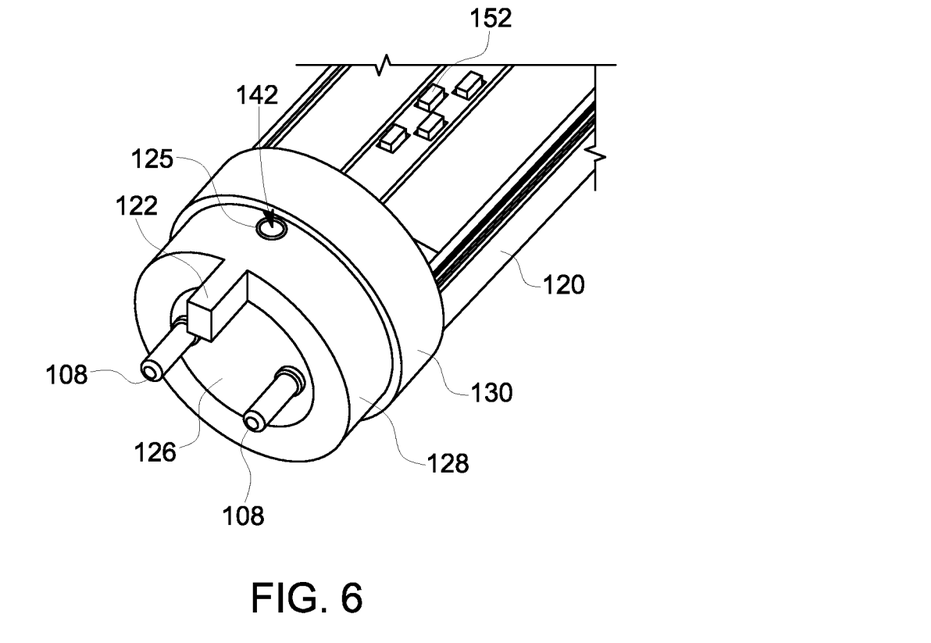
FIG. 6 illustrate a perspective view of the safety switch of the safety locking device armed in a locked position.

FIG. 6 depicts safety switch 124 in the armed position such that switch button 142 projects lightly through bore 125 in the safety device housing 134. In the armed position, the switch 124 interconnects the electrical circuitry in the housing 112 to activate the LED replacement lamp 100. The cylindrical protuberance of switch button 142 extends through bore 125 and functions as a safety protrusion to prevent removal of the lamp 100 from the lighting fixture 110. The protruding switch button 142 blocks the movement of the first housing 128. Upon a second depression of the switch button 142, the switch button 142 returns to the unarmed position to enable the lamp tube 120 to be removed from the lighting fixture 110. As mentioned above, the example switch button 142 illustrated in FIG. 6 has a cylindrical shape. Of course, many variations in the size and shape are possible without departing from the invention, such as triangular, rectangular, columnar, oval etc.

In use, the replacement LED lamp 100 is inserted into the housing 112 of the lighting fixture 110 by aligning the pins 108 at the end members 101 and 103 with the openings 116 of the lamp holders 114 and 115, respectively. For end member 101, which includes a safety locking device 104, the end member 101 is inserted within the opening 116 until the locking mechanism 122 mates with the opening 116. After being inserted in the housing 112, the lamp tube 120 in connection with the internal chamber 126 is rotated while locking mechanism 122 mated within opening 116 of the lamp holder 114 retains the safety device housing 134 stationary relative to the lamp holder 114.

Rotation of the lamp 100 exposes the switch button 142 for access through bore 125 for manual activation of the safety switch 124. A pin tool is inserted through bore 125 to depress switch button 142 to urge it upwardly to protrude through bore 125 in an armed position. When in the armed position, the switch 124 electrically interconnects the electrical circuitry in the housing 112 to activate the LED replacement lamp 100 and the protrusion of switch button 142 extending through bore 125 prevents removal of the lamp 120 from the housing 112.

Alternative embodiments, examples, and modifications which would still be encompassed by the disclosure may be made by those skilled in the art, particularly in light of the foregoing teachings. Further, it should be understood that the terminology used to describe the disclosure is intended to be in the nature of words of description rather than of limitation.

Those skilled in the art will also appreciate that various adaptations and modifications of the preferred and alternative embodiments described above can be configured without departing from the scope and spirit of the disclosure. Therefore, it is to be understood that, within the scope of the appended claims, the disclosure may be practiced other than as specifically described herein.

We claim:

1. A lighting assembly for inserting a lamp into a fluorescent light, comprising:
    a light emitting diode (LED) unit having a first end and a second end; and
    a safety locking device positioned on at least one of the first end and the second end of the LED unit and coupled to a lighting fixture;
    wherein the safety locking device includes a switch defining an unarmed state and an armed state, the safety switch being mechanically linked and electrically connected to the LED unit, and
    wherein the armed state enables an electrical communication between the first end and the second end of the LED unit to activate the LED unit.

2. The lighting assembly of claim 1, further comprising a protrusion member extending from the safety locking device for engagement with the lighting fixture, wherein the protrusion member remains stationary relative to the lighting fixture during a locking movement of the LED unit.

3. The lighting assembly of claim 1, wherein the locking movement of the LED unit provides access to the safety switch and to prevent the risk of shock the safety switch remains off in the unarmed position until manual activation.

4. A light source, comprising:
    a light emitting diode (LED) unit having a first end and a second end; and
    a safety locking device positioned on at least one of the first end and the second end of the LED unit,
    wherein the safety locking device includes a first portion, a second portion, and a safety switch, the first portion being configured for coupling with a lighting fixture,
    wherein the second portion is configured for connecting to the LED unit such that when the LED is moved into a locked position, the first portion remains stationary, the second portion moves to provide access to the safety switch for activation, and
    wherein the safety switch remains off in the unarmed position until manual activation.

5. The light source of claim 4, wherein the first portion comprises a first housing having a cavity therein and a protruding member extending therefrom for engagement with the lighting fixture and the second portion comprises a second housing, wherein the second housing is rotatably positioned within the cavity of the first housing.

6. The light source of claim 5, wherein the first housing comprises a first opening, the second housing comprises a second opening, and the safety switch is mounted in the second opening of the second housing to prevent inadvertent activation of the safety switch during installation of the LED unit.

7. The light source of claim 6, wherein movement of the LED unit into the locked position aligns the first opening in the first housing and the second opening in the second housing to provide access to the safety switch for activation.

8. The light source of claim 7, wherein depression of the safety switch through the first opening urges a stem of the safety switch upward to a position extending outwardly of the first opening and operates at least one switch contact to activate the LED unit.

9. The light source of claim 8, wherein activation of the LED unit establishes an electrical connection between the first end and the second end of the LED unit.

10. The light source of claim 8, wherein the stem extending outwardly of the first opening prevents removal of the LED unit from the lighting fixture.

11. The light source of claim 5, wherein the protruding member comprises a locking member for engagement with a lamp holder provided in the lighting fixture.

12. The light source of claim 4, wherein the LED unit is configured to be coupled to the lighting fixture without modification of the components of the lighting fixture.

13. The light source of claim 4, wherein the LED unit is configured to be coupled to the lighting fixture without modification of at least one of a housing of the lighting fixture and electrical circuitry of the lighting fixture.

14. The light source of claim 4, wherein the LED unit is configured to be installed in and operable with a variety of conventional fluorescent lighting fixtures having different types of ballast.

15. The light source of claim 14, wherein the types of ballast are selected from at least one of a switch start electronic ballast, a rapid start electronic ballast, and a program start electronic ballast.

16. The light source of claim 1, wherein the LED unit is selected from at least one of a T5 LED lamp, a T8 LED lamp, and a T12 LED lamp.

17. A method of inserting a replacement lamp into a conventional fluorescent lighting fixture, the method comprising:
    inserting a light emitting diode (LED) unit into a first end and a second end of a lighting fixture;
    providing a safety locking device having a first housing and a protruding member extending therefrom for engaging the lighting fixture and having a second housing connected to a LED unit;
    when the LED unit is moved into a locked position, permitting relative movement between the LED unit in combination with the second housing and the lighting fixture and preventing relative movement between the protruding member and the lighting fixture;
    when the LED unit is moved into the locked position, movement of the second housing permits access to a safety switch mounted therein for activation, wherein the safety switch remains off in an unarmed position to prevent a risk of shock; and
    activating the LED unit by accessing the safety switch through a bore provided in the first housing and physically contacting the safety switch.

18. The lighting assembly of claim 1, wherein the safety switch is configured to prevent a risk of shock when the safety switch changes from the unarmed state to the armed state upon manual activation of the safety switch after movement of the LED unit into a locked position.

* * * * *